March 30, 1971     J. N. RYERSON ET AL     3,573,186
CONVEYER TYPE ELECTROPLATING APPARATUS Filed Feb. 2, 1968                       5 Sheets-Sheet 1

INVENTORS
JAMES N. RYERSON
DAVID S. ACKERMAN
ARNOLD E. KREAM

BY
ATTORNEYS

United States Patent Office 3,573,186
Patented Mar. 30, 1971

3,573,186
CONVEYER TYPE ELECTROPLATING
APPARATUS
James N. Ryerson, Oceanport, David S. Ackerman, Linden, and Arnold E. Kream, Clark, N.J., assignors to Sel-Rex Corporation, Nutley, N.J.
Continuation-in-part of applications Ser. No. 310,274, Sept. 20, 1963, and Ser. No. 433,029, Feb. 16, 1965. This application Feb. 2, 1968, Ser. No. 702,706
Int. Cl. C23b 5/68; B65g 49/00
U.S. Cl. 204—203
15 Claims

ABSTRACT OF THE DISCLOSURE

In the illustrated embodiments precious metal plating is carried out by a loop series of tanks on a table, small electronic components being automatically individually partially immersed so as to plate predetermined portions of the components. Multiple parts may be treated by quick disconnect fixtures with precise locating surfaces. The entire machine may be sold as a complete package requiring a minimum of site preparation. The same machine may be adapted to barrel plating operation.

CROSS-REFERENCES TO RELATED APPLICATIONS

The present application is a continuation-in-part of our copending applications Ser. No. 310,274, filed Sept. 20, 1963, now abandoned and Ser. No. 433,029, filed Feb. 16, 1965 now U.S. Pat. No. 3,409,531.

The disclosure of the copending commonly owned application Ser. No. 654,436 filed July 19, 1967 now U.S. Pat. No. 3,462,013 is incorporated herein by reference in its entirety as disclosing a preferred level control system for use with the illustrated apparatus.

BACKGROUND OF THE INVENTION

Heretofore so far as we are aware the automatic processing of small parts which require precious metal plating has been carried out by placing the parts in a barrel type work container which is rotated on a horizontal axis while it is immersed in the precious metal plating solution. Except for such barrel plating operations, the processing of such parts has been carried out as a series of manually executed steps rather than automatically.

In the case of precious metal processing the disadvantages of the barrel type apparatus are very severe. For example, prior to the present invention reed switch contact blades were barrel plated even though this resulted in depositing a layer of precious metal over the entire area of the part rather than covering only the tip end thereof where the precious metal coating was actually required.

Further in barrel plating the parts are subject to mechanical distortion as a result of the tumbling motion imparted thereto by the rotating barrel. Also since the parts are randomly disposed in the barrel, electrical contact with the parts can be imperfect giving rise to inadequate plating of certain of the parts and the consequent need for an elaborate inspection procedure.

The need for automatic processing is evident from the acceptance by the art of the losses inherent in barrel plating (when the damage to the parts could be held to acceptable levels), even though the economic value of the wasted precious metal was very substantial.

SUMMARY OF THE INVENTION

The present invention provides an apparatus for the automatic precious metal plating of small parts which overcomes the disadvantages of the prior art barrel plating approach. Specifically the invention provides a precision automatic plating apparatus for coating predetermined surface areas of a succession of work units with a precious metal. In the electrodeposition of precious metals such as gold it is clearly advantageous to control with substantial precision the extent of the part on which the precious metal is deposited, in order to avoid waste of the expensive plating material.

One commercial machine in accordance with the present invention is capable of plating 450 conveyor arms per hour and yet meets the critical requirements for precious metal plating in the electronics industry. The processing tanks of this machine are mounted on a table under a transparent canopy. The unit is supplied with its own hot air blow-off dryer. Water supply and drains for rinse tanks are pre-piped within the supporting frame for the table. Ventilation and direct current power units are installed as integral parts of the system. The system may thus be sold as a complete package requiring the minimum of site preparation and facilities.

It is therefore an important object of the present invention to provide automatic precious metal plating apparatus providing for precise location of work units during travel through a precious metal plating solution or the like.

It is another object of the present invention to provide a novel automatic precious metal processing machine which may be sold substantially as a complete package requiring a minimum of site preparation and facilities.

A further object of the present invention is to provide an automatic processing apparatus which is adaptable both to the precious metal plating of selected areas of small parts and to the barrel plating of small parts (where the parts are to be completely coated with a plating material, for example).

Another object of the invention is to provide a work carrier providing a precision adjustment of the work position for use in precision precious metal plating and the like.

Another object of the present invention is to provide a work carrier providing for plating of work units to any of a plurality of precisely controlled depths.

Still another object of the present invention is to provide a precious metal processing system in which a plurality of parts to be plated can be loaded onto a fixture in a precise position to cause each part to receive an equal amount of plating.

Yet another object of the present invention is to provide a fixture which can be quickly and easily loaded of parts to be plated, and thereafter quickly and easily unloaded of such parts.

A still further object of the present invention is to provide an electroprocessing fixture for transistors or the like.

Other objects, features and advantages of the present invention will be apparent from the following detailed description taken in connection with the accompanying drawings.

BRIEF DESCRIPTION OF THE DRAWINGS

FIG. 10 is a somewhat diagrammatic view of a single channel of a fixture which is used with the precious metal processing machine of FIG. 1 and which channel is shown in a loading position to receive transistors or the like;

FIG. 11 is a somewhat diagrammatic view of a complete fixture which comprises a plurality of channels as shown in FIG. 10 and which channels are shown in a plating position;

FIG. 12 is a detailed view of a pivotally connected carrier arm assembly which is used to carry the fixture of FIG. 11 during the plating process;

FIG. 13 is a vertical sectional view taken along line XIII—XIII of FIG. 12;

DESCRIPTION OF THE PREFERRED EMBODIMENTS

Figure 1:
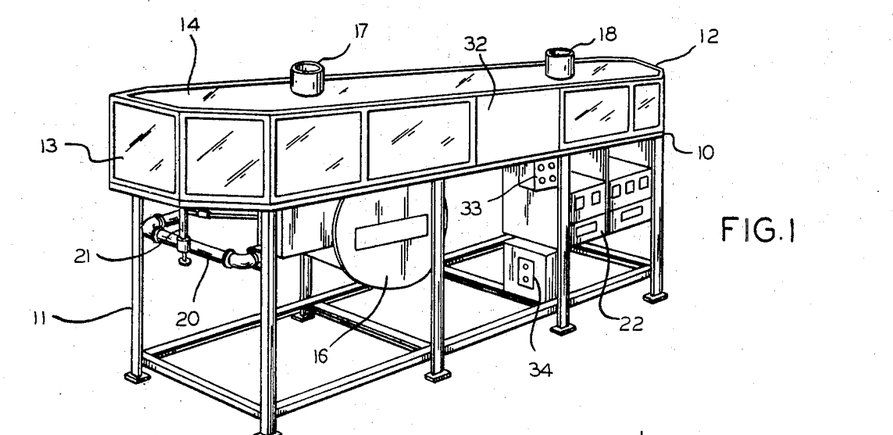
FIG. 1 is a somewhat diagrammatic perspective view of a precious metal plating machine in accordance with the present invention.
Figure 2:
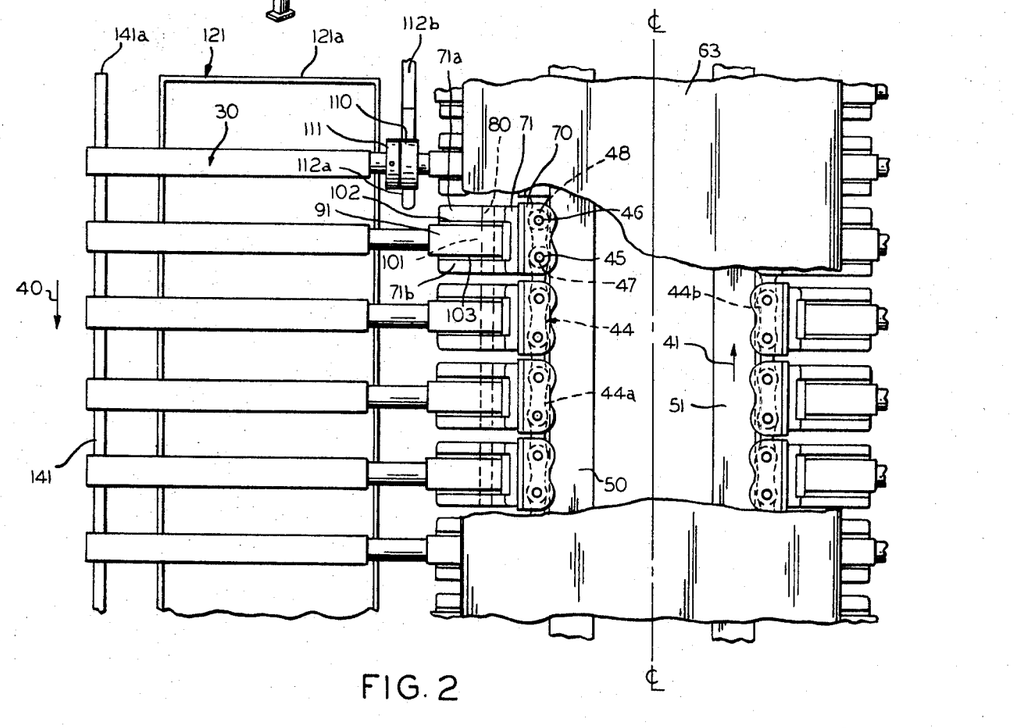
FIG. 2 is a somewhat diagrammatic fragmentary plan view of the apparatus of FIG. 1.
Figures 3, 4, 5, 6, 7, 8, 9:
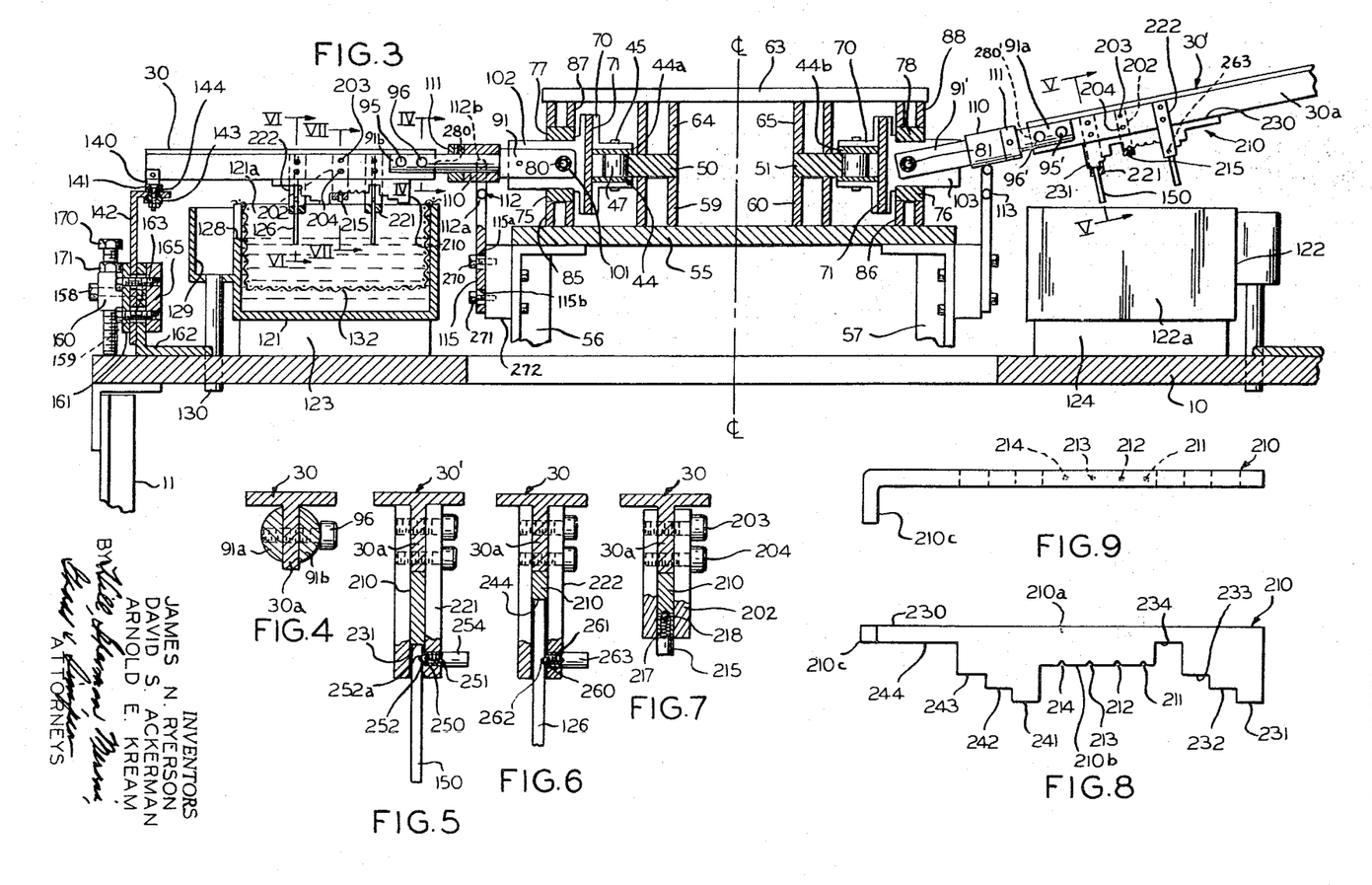
FIG. 3 is a somewhat diagrammatic vertical sectional view showing at the left work units travelling in a precious metal plating tank and at the right work units being transferred between successive tanks of the precious metal processing machine of FIG. 1.
FIG. 4 is a vertical sectional view taken along the line IV—IV of FIG. 3.
FIG. 5 is a vertical sectional view taken along the line V—V of FIG. 3.
FIG. 6 is a vertical sectional view taken along the line VI—VI of FIG. 3.
FIG. 7 is a vertical sectional view taken along the line VII—VII of FIG. 3.
FIG. 8 is a side elevational view of a work positioning gauge in accordance with the present invention.
FIG. 9 is a top plan view of the work positioning gauge of FIG. 8.

FIG. 1 represents a commercial embodiment of the present invention wherein the conveying apparatus such as represented in FIGS. 2 and 3 is associated with a series of processing tanks mounted on a table or platform 10 which is supported from the factory floor or other rigid horizontal surface by means of a frame 11. The tanks and conveyor apparatus are covered by means of a canopy 12 having a series of transparent windows such as indicated at 13 and 14. A hot air blower mechanism may be mounted as indicated at 16 within the frame 11 for discharging hot air into a space thereabove within the canopy 12 to provide for a circulation of hot air in and about the work units travelling toward a work unloading position, for example. The intake for the blower may be suitably filtered as required to prevent foreign matter from reaching the interior space of the canopy 12, and the interior space of the canopy may be vented by tubes 17 and 18. Water supply pipes such as 20 and drains such as indicated at 21 for the rinse tanks are pre-piped integrally with the frame 11 as is the blower 16 and its ducts. Direct current power units such as indicated at 22 are installed as integral parts of the system. The machine may thus be sold as a complete package requiring the minimum of site preparation and facilities.

The particular machine illustrated is for precision precious metal plating of electronic components. The machine is capable of processing 900 parts per hour, and the work units are circulated by means of work carriers such as indicated at 30 moving in a closed loop path within the canopy 12. Access to the carrier arms 30 for loading and unloading of work units may be provided at a section such as indicated at 32 of the canopy 12. The controls for the unit may be located at panels such as indicated at 33 and 34 adjacent the location 32.

Referring to FIG. 2, the work carriers 30 are moved in the direction of arrow 40 at one side of the machine such as the far side as viewed in FIG. 1 and are moved in the opposite direction as indicated by arrow 41 at the other long side of the machine such as the near side as viewed in FIG. 1. An endless chain is indicated at 44 having straight lengths thereof 44a and 44b at opposite sides of the center line of the machine and connected by semicircular length portions at the opposite ends of the machine. Suitable sprocket wheels (not shown) may be located at opposite ends of the machine and receive the chain 44 thereabout, the sprocket wheels being rotatable on vertical axes.

As seen in FIG. 2, each link of the chain may be joined with an adjacent link by means of pins such as 45 and 46. The pins 45 and 46 carry rollers such as indicated at 47 and 48 riding on respective chain roller guide rails indicated at 50 and 51. These rails 50 and 51 terminate adjacent the sprocket wheels at the opposite ends of the chain since the chain is guided by means of the teeth of the sprocket wheels at the ends of the chain path.

Referring to FIG. 3, a conveyor mounting plate 55 may be supported by suitable frame members such as indicated at 56 and 57 which are rigidly connected with the frame 11. As seen in FIG. 3, chain roller guide rails 50 and 51 may be supported from plate 55 by means of spacers of tubular configuration such as indicated at 59 and 60. A top plate 63 is supported from rails 50 and 51 by means of further spacers 64 and 65. Suitable fastening means such as bolts or the like may fasten plate 63 with plate 55 and extend through the interiors of spacers such as 59 and 64, and 60 and 65.

At each carrier position along the chain 44, the chain is provided with angle brackets such as indicated at 70 secured to a carrier arm attachment bracket such as indicated at 71. The attachment brackets 71 are guided by means of lower rails 75 and 76 and upper rails 77 and 78 so as to maintain the pivot shafts such as indicated at 80 and 81 carried by the brackets 71 at a precise level relative to the table 10. The lower attachment rails 75 and 76 are mounted on the plate 55 by means of spacers such as indicated at 85 and 86 receiving suitable fastening means through the interior thereof, and the upper attachment guide rails 77 and 78 are suspended from the plate 63 by means of spacers such as indicated at 87 and 88 with suitable fastening means extending through the interior of the spacers (not shown). The plate 63 thus serves to suspend the attachment guide rails 77 and 78 which together with the guide rails 75 and 76 and the roller guide rails 50 and 51 serve to guide the carrier arm attachment members 71 along the opposite straight portions of the chain path.

Since in the illustrated embodiment the carrier arm assemblies are identical except as hereafter described, corresponding reference numerals will be applied to certain similar parts of both of the carrier arm assemblies shown in FIG. 3. Certain parts of the right hand carrier arm assembly have been given corresponding primed reference numerals to indicate an alternative construction which may be employed. The carrier arms 30 and 30' shown in FIG. 3 are secured to the attachment brackets 71 by means of pivot members 91 and 91'. As seen in FIG. 2, the attachment brackets 71 are provided with journal flanges 71a and 71b receiving the shafts such as indicated at 80 which mount the pivot members 91. The shaft 80 is provided with a bushing 101, FIG. 3, for insulating the pivot member 91 from the shaft 80, and the side flanges 71a and 71b are provided with insulation as indicated at 102 and 103, FIG. 2, for electrically isolating the pivot member 91.

Each of the carrier arm pivot members 91 is slotted at its outer end to provide end portions 91a and 91b receiving the vertical leg portion 30a of one of the carrier arms 30 as seen in FIG. 4. Fastening means are indicated at 95 and 96 in FIGS. 3 and 4 for securing the carrier arms with the pivot members 91.

Each of the carrier arm pivot members 91 is provided with a roller 110 which is freely rotatable on a cylindrical portion of the member 91 and is retained in position on the member by means of a collar such as indicated at 111. Cam track sections are indicated at 112 and 113 for raising the carrier arms at desired locations along the path of the conveyor chain. The cam track sections may be mounted by means of suitable plates such as indicated at 115 which are supported at a fixed position relative to the frame members such as 56 and 57.

As seen in FIG. 3, the processing apparatus may comprise a series of processing tanks such as indicated at 121 and 122 supported on the table 10 by means of suitable spacers such as indicated at 123 and 124.

By way of example, the tank 121 may contain a solution of a precious metal to be plated on work units such as indicated at 126. The level of the plating solution is precisely determined by means of an overflow passage such as indicated at 128 leading to a drain reservoir 129 and a drain pipe 130. Simply by way of example, a rectangular screen anode has been indicated at 132 extending along the bottom of the tank 121.

As seen in FIG. 3, the outer free ends of carrier arms 30 are provided with collector shoes such as indicated at 140 riding on a horizontal carrier guide rail 141. The guide rail 141 is supported at a precisely determined adjustable horizontal level by means of a bracket 142 which is insulated from the rail by means of a bushing 143 and washer 144. The rail 141 preferably is connected to the electrical supply so as to serve as a cathode connection with the carrier arms as the carrier arms move across the plating tanks such as indicated at 121. Insulated sections of rail aligned with the rail 141 may support the carrier arms at other portions of the machine particularly where the level of the work pieces such as 126 is to be precisely determined. At other portions of the machine where the positioning of the work is not critical, cam sections such as indicated at 112 may be provided with lower horizontal sections of a height to suitably support the carrier arms. Of course, at the plating tanks, the lower portions of the cam tracks such as indicated at 112a do not determine the horizontal level of the carriers resting on the cathode rails such as indicated at 141.

The right hand side of FIG. 3 shows a cam track section 113 which serves to pivot the carrier arms upwardly about the axes of shafts such as indicated at 81 so as to clear the work 150 of the end wall 122a of the tank 122.

By way of a preferred example of an adjustment mechanism for the rail sections such as indicated at 141, a block 160 has been indicated secured to a plate 161 and to bracket 142 by means of screws such as 158. The bracket 142 and an angle bracket 162 may have vertically elongated slots therein receiving clamping screws such as indicated at 163. The screws 158 may be located on opposite sides of angle bracket 162 so as to receive nuts such as 159 seated against the right hand face of bracket 142 as viewed in FIG. 3. The angle bracket 162 may be secured to the table 10. A clamping nut member 165 may threadedly receive the screws such as 163. The block 160 may have a threaded aperture receiving a screw 170 which at its lower end engages the top surface of table 10. A locking nut is indicated at 171 for fixing the screw 170 in a desired adjusted position. Thus, to adjust the height of rail 141, screws such as 163 are loosened and lock nut 171 is loosened and screw 170 turned to provide the desired height of the rail 141. The bracket 142 is then clamped to the angle 162 by means of the screws such as 163 and screw 170 is locked in its adjusted position by means of nut 171.

By way of illustration, the leading end 121a of tank 121 has been indicated in FIG. 2 and the beginning of the cathode rail 141 has been indicated at 141a. These parts are arranged so that as the carrier arms 30 pivot downwardly into operative position to the solution within tank 121, the free ends of the arms rest upon the cathode rail 141. The cam rail section 112 may include an upper portion 112b laterally aligned with the end wall 121a of tank 121 so as to maintain the carrier arms in the upwardly pivoted condition indicated at the right in FIG. 3. The lower level portion 112a of the cam track may terminate as indicated in FIG. 2, since this portion of the cam track does not perform a supporting function at the plating tank 121. It will be understood, however, that there is a downwardly inclined section connecting portions 112b and 112a of the cam track 112 and that there is a similar upwardly inclined portion in advance of end wall 121a of tank 121 unless the work carrier arms are already in an upwardly pivoted condition.

Referring to FIGS. 3 and 7, it will be observed that the carrier arms 30 have housings 202 secured thereto by means of screws 203 and 204 and that the housings have rectangular apertures receiving corresponding cross section portions of workpiece locating plates 210. Specifically, the housing 202 receives a constant cross section portion 210a of plate 210, FIG. 8, which has a series of notches 211–214 along a lower edge face 210b thereof. The housing 202 includes a casing 215 having a compression spring 217 urging a ball detent 218 against the lower edge 210b so as to be seated selectively in one of the notches 211–214 to fix the lateral position of the plate 210 with respect to the carrier arm 30.

The carrier arms have similar housings 221 and 222. For illustrative purposes, the housing 221 on the right hand carrier as viewed in FIG. 3 has been shown as having a workpiece 150 located by edge face 231 of gauge 210. Exemplary details have been indicated in FIG. 5. Housing 222 associated with the left hand carrier arm 30 in FIG. 3 has been shown as having the workpiece 126 associated therewith. By way of example, the workpieces 126 and 150 may be of different length and may require a different depth of immersion in the plating solution of plating tank 121.

Referring to FIG. 8, it will be observed that the positioning plate or gauge 210 has an upper edge face 230 and lower edge faces 231–234 and 241–244 at successively different vertical distances from the edge face 230 FIG. 5 shows the edge face 231 of the work positioning gauge 210 determining the depth of plating for the workpiece 150 while edge 244 of the gauge 210 is shown as locating workpiece 126 in FIG. 6. Any suitable means may be provided for retaining the workpieces 126 and 150 with their upper edge faces in abutting pressure contact with the lower edge faces 231 and 244. By way of example, ball detents have been indicated for this purpose. Referring to FIG. 5, a ball 250 is urged by means of a compression spring 251 against the upper sloping surface such as indicated at 252a of a notch 252. In the illustrated structure, the ball 250 is not seated at the bottom of the notch 252 so that there is a component of force tending to press the upper edge face of workpiece 150 against the edge face 231 of plate 210. The casing 254 for the spring 251 is, of course, secured in a suitable aperture in the housing 221.

The structure for positioning workpiece 126 in FIG 6 may comprise a ball 260, a compression spring 261, a recess or notch 262 and a casing 263 secured to the housing 222.

As seen in FIG. 8, the spacing between the successive notches 211–214 corresponds to the spacing between the successive edge faces such as 231–234 and 241–244 so that when the positioning plate 210 is shifted laterally to align a different one of the notches 211–214 with the detent 218, FIG 7, a corresponding different edge face of the series 231–234 will be located in housing 221 and a corresponding different edge face of the series 241–244 will be positioned in the housing 222. Lateral adjustment of the positioning plate 210 is facilitated by a turned end portion 210c best seen in FIG. 9 which may be conveniently grasped by the fingers of the operator.

By way of example, the gauge or positioning plate 210 may have its lower edge faces such as 231–234 and 241–244 located with an accuracy of plus or minus .001 inch with respect to the upper edge 230. The carrier arm and gauge may have a thickness of ⅛ inch, for example. The carrier arms may be of extruded aluminum and of T cross section. The work holding housings 221 and 222 may have a sliding fit with respect to the sides of gauge 210 adn may have 1/16 inch diameter apertures at the lower ends thereof receiving the upper cylindrical ends of the workpieces such as 126 and 150 with a tight fit.

Simply by way of example, the chain may have successive pins such as indicated at 45 and 46 spaced one inch apart with the total chain length being 240 inches. The chain may be suitably driven either continuously or intermittently through the medium of one of the sprocket wheels at the ends of the chain loop.

The basic machine may, of course, incorporate a selectively operable by-pass of any of the processing stations, and other features such as air agitation, solution recirculation and the like may be provided.

The carrier rollers 110 may ride on a horizontal elongated cam track section disposed at the level of the cam track portion 112b in FIG. 3 for maintaining the arms in the upper position adjacent the loading and unloading section of the machine such as indicated at 32 in FIG. 1. The height of tracks 112 and 113 may be adjustable by means of clamping screws such as 270 and 271 which extend through vertically elongated slots 115a and 115b of mounting plate 115 and threadedly engage fixed block 272.

By way of example, the frame 11 may support the table 10 at a height of approximately three feet above the factory floor or other rigid supporting surface.

Figures 10, 11, 12, 13:
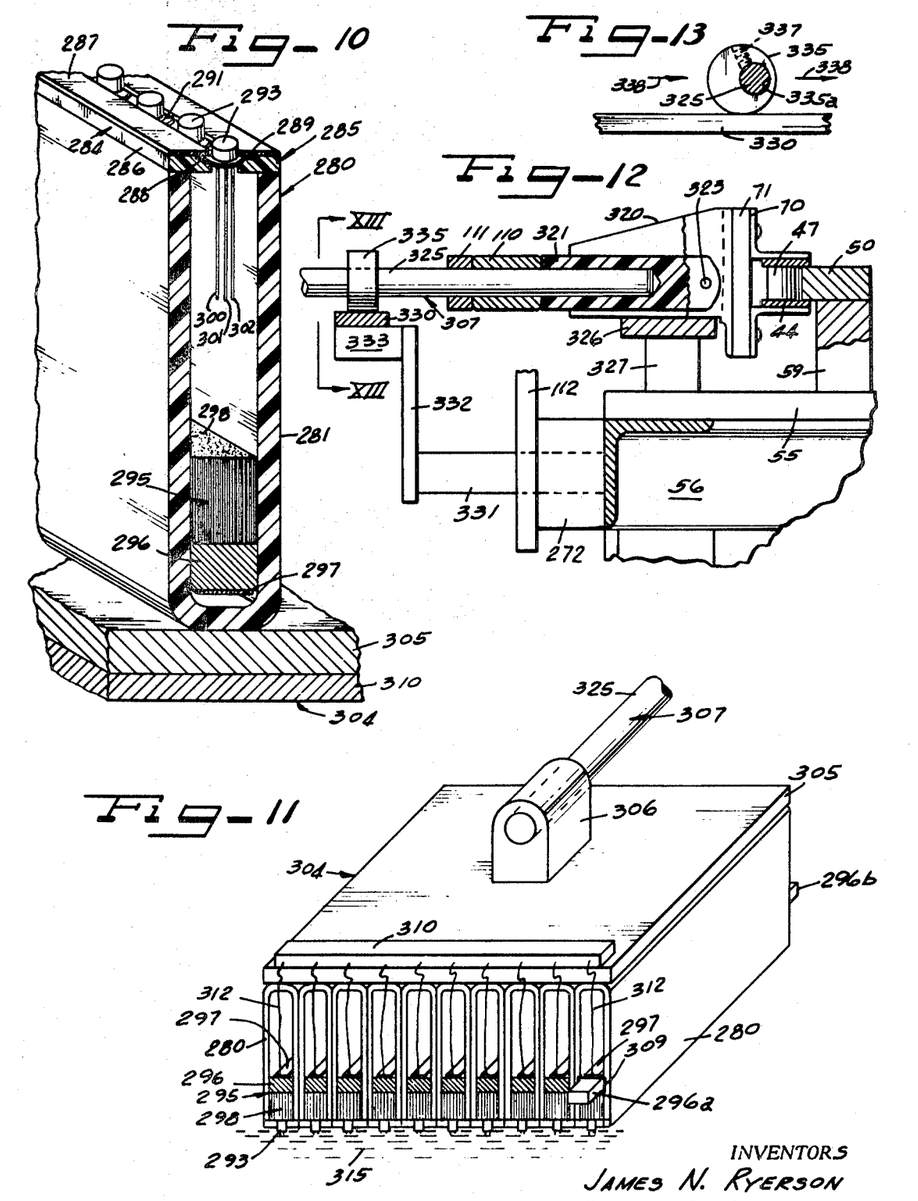

Shown in FIG. 10 is a single channel mounting bracket 280 which is expressly designed to receive transistors or the like which are to be electroplated. The mounting channel 280 is formed by a U-shaped member 281 which is of insulating material such as plastic. Secured to the extreme ends of the leg portions of the U-shaped bracket 281 are a pair of fluted channel assemblies 284 and 285, which preferably each comprise an elongated notched strip 286 and a thin elongated cover strip 287. The strip 287 is secured or bonded to the notched strip 286 in such a manner that a flute 288 is provided by the notched strip 286 and the strip 287. The fluted channel 285 is constructed in substantially the same manner as the fluted channel 284 to provide a flute 289. The fluted channels 284 and 285 are secured to the U-shaped mounting bracket 281 in such a manner as to provide the flutes 288 and 289 in parallel relation with each other, and also, the cover strips 287 are in spaced parallel relation to provide an opening 291 to receive the heads of transistors such as indicated by 293. Flutes 288 and 289 and the opening 291 form an indexing slot which extends the entire length of the mounting bracket 280 to receive a plurality of transistor heads as shown in FIG. 10. It can be seen therefore, that the transistors are loaded into the indexing slot of the mounting bracket 280 one after another in serial fashion until the mounting bracket 280 is completely filled Slidably carried within the U-shaped member 281 is a brush assembly 295 which consists of a brush head 296, a current lacing strip 297, and a multitude of small diameter wires 298 which are preferably of stainless steel to form the bristles of the brush 295. When the mounting bracket 280 is in the loading position, as shown in FIG. 10, the brush 295 will fall to the bottom of the U-shaped channel to prevent interference between the bristles 298 and the electrical leads 300–302 of the transistors 293. The leads 300–302 of transistors 293 are shown as being of the long flexible type; however, the transistor 293 may have leads which are short and rigid such as those found on power transistors.

FIG. 11 shows a plurality of U-shaped mounting brackets 280 secured to a mounting plate 305 to form a fixture 304 capable of carrying a large number of transistors during the electroplating process. Also secured to the mounting plate 305 of the fixture 304 is a support 306 which is secured to an end portion of a carrier arm assembly 307. The fixture 304 is shown in the plating position with the heads of the transistors facing downward and with the bristles 298 of the brushes 295 in contacting relation with the transistor leads 300–302. It will be noticed in FIG. 11 that the transistor leads are assumed to be of the short rigid type as mentioned hereinabove; this type of lead may allow the brushes 295 to fall substantially to the bottom of the mounting bracket 280.

All the mounting channels 280 are substantially constructed in the same manner and therefore only one mounting channel has been selected to show the manner by which the brush assembly 295 is slidably retained in the U-shaped channel. The brush head 296 has extended portions 296a and 296b which extend beyond the respective ends of the U-shaped mounting channel 280. A retainer 309, which has a central aperture shaped in correspondence to the cross section of the end portion of the brush head, is secured to the brush assembly 295 for movement therewith. A similar retainer is provided at the end portion 296b thereby maintaining the brush assembly 295 longitudinally within the U-shaped mounting channel 280 and in a horizontal orientation.

A plug-in contact strip 310 is secured to the mounting plate 305 in such a manner as to receive the current carrying leads 312 each of which is connected to the copper lacing strip 297 of an associated brush assembly 295. As shown in FIG. 11, each of the current carrying leads 312 is plugged into or otherwise detachably connected to the contact strip 310.

The plurality of mounting channels 280 must be maintained in a substantially horizontal position over a plating solution 315 so that each of the transistor heads 293 is submerged an equal depth in the plating solution 315.

FIG. 12 shows an alternate embodiment of a carrier arm assembly which can be used to maintain the mounting channels 280 in a horizontal position over the plating fluid 315 in place of the arrangement of FIG. 3. Secured to the attachment bracket 71 in FIG. 12 is a U-shaped mounting bracket 320 which is arranged to receive a pivot member 321. The pivot member is preferably of electrically substantially non-conductive insulating material. A pin 323 is provided to pivotally connect the pivot member 321 to the bracket 320. Secured to the pivot member 321 is a rod 325 which serves to detachably receive the support 306 of FIG. 11, and to provide a current conductor for the electroplating process. Rotatably mounted on the rod 325 is the roller 110 which, as mentioned hereinabove, serves to engage the cam track 112 to raise and lower the carrier arm assembly 307 as required. The bracket 320 moves on a rail 326 which is supported by spacers such as 327. A second rail 330 is supported from the frame 56 by means of support members such as 331, 332 and 333 which are fastened together in a suitable manner and secured to the frame 56. The rail 330 provides an electrical contact means whereby electrical current required for the plating process is transmitted from the fixed rail 330 to the moving rod 325 by means of a contact cam 335. The support member 333 is preferably of electrical insulating material to prevent electric current from passing through the frame 56.

As shown in FIG. 13, the contact cam 335 is provided with an eccentric bore 335a to receive the current carrying rod 325. The cam 335 is maintained in a fixed position on the rod 325 by means of a set screw 337. As the cam 335 and rod 325 move in the direction of the arrows 338, the cam will make continuous electrical contact with the rail 330 during predetermined portions of the electroplating process. If it is desired to adjust the horizontal position of the carrier arm 307, the cam 335 is loosened on the rod 325 and rotated thereabout to either raise or lower the carrier arm assembly to establish the carrier arm assembly 307 in a substantially horizontal position. In this manner, the mounting plate 305 and mounting channels 280, of FIG. 11, can be adjusted to a horizontal position over the plating fluid 315.

Figure 14:
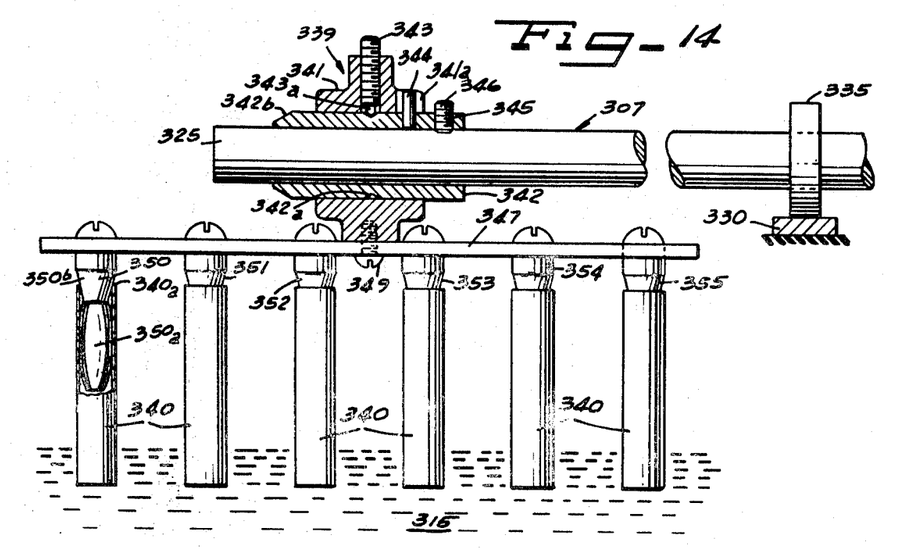
FIG. 14 is another embodiment of a fixture which can be used with the processing machine of FIG. 1.

Shown in FIG. 14 is another fixture arrangement 339 whereby a plurality of parts 340 can be secured to the end of the carrier arm assembly 307. A hub 341 is secured to and adapter bushing 342 by means of a set screw 343 and a pin 344. The bushing 342 is provided with a tapped hole 345 to receive a set screw 346 which is provided to secure the bushing 342 to the rod 325. In this manner, the bushing can be slidably adjusted to any desired position and then secured in place by the set screw 346. A rack 347 is secured to the hub 341 by means of a screw 349. The fixture 339 is placed on the end of the rod 325 by sliding the hub 341 onto the bushing 342 so that the pin 344 is received by an indexing slot 341a which serves to maintain the fixture 339 in a substantially vertical position over the plating solution 315. The hub 341 is then secured to the bushing 342 by the set screw 343. The rack 347 is provided with a plurality of male plug members 350–355. The male plug members 350–355 are typically shown by the plug 350 which consists of an extended resilient portion 350a and a shoulder or stop portion 350b. In this instance, the work to be plated is of tubular form and is placed onto the plugs 350–355 in such a manner that the top edge 340a of the piece to be plated comes in contact with the stop member 350b of the plug 350, thereby maintaining the parts 340 at a fixed distance from the rack 347 to maintain all the parts 340 in the plating solution 315 to an equal depth.

Figure 15:
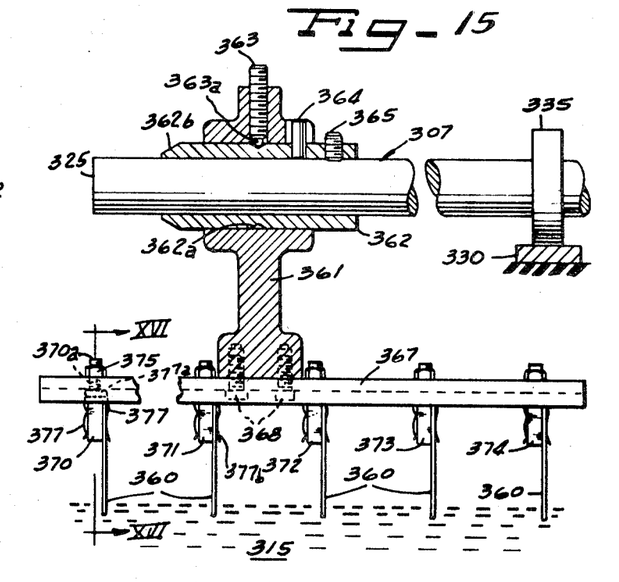
FIG. 15 is still another embodiment of a fixture which can be used with the processing machine of FIG. 1.

Shown in FIG. 15 is still another fixture arrangement whereby a plurality of parts 360 can be secured to the end of the carrier arm assembly 307 during the plating process. A hub 361 is secured to an adapter bushing 362 by means of a set screw 363 and pin 364. The bushing 362 is secured to the rod 325 by means of a set screw 365. A rack 367 is secured to the hub 361 by means of screws 368. Secured to the rack 367 is a plurality of retainers such as indicated at 370–374. The retainers 370–374 are substantially similar and consist of a threaded portion such as 370a. The retainer 370 is secured to the rack 367 by means of a nut 375. An inverted U-shaped spring clip 377 is secured between the rack 367 and the retainer 370 and provides clip means whereby the parts 360 can be secured between the retainer 370 and the spring clip 377 during the plating process. Thus the parts 360 can be quickly and easily detachably connected to the rack 367. The parts 360 are partially submerged in the plating solution 315 during a portion of their travel through the processing machine as in the preceding embodiments.

Figure 16:
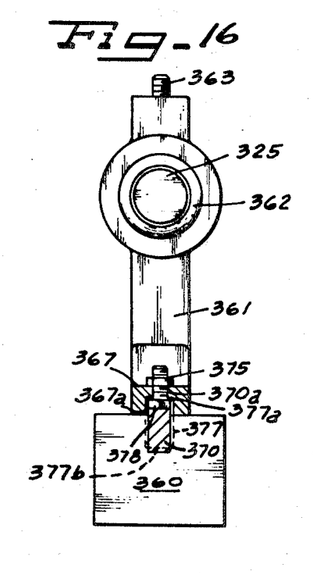
FIG. 16 is a vertical sectional view taken along line XVI—XVI of FIG. 15.

Shown in FIG. 16 is an end section view taken along the lines XVI—XVI of FIG. 15. FIG. 16 specifically shows the retainer 370 and spring clip 377 secured within a channel 367a of the rack 367. The retainer 370 may also have a nut 378 for purposes of adjusting the retainer 370 vertically up and down on the rack 367. In FIG. 15 the cathode current for the parts 360 is provided by the current pickup rail 330, through current cam 335, rod 325, bushing 362, hub 361, rack 367, and retainer 370. The cathode current for the tubular parts 340, FIG. 14, is provided in substantially the same manner.

SUMMARY OF OPERATION

In placing the machine in operation, work units such as indicated at 126 in FIG. 3 are positioned on the carrier arms 30 with the upper ends of the workpieces abutting respective edge faces such as iidicated at 244 in FIGS. 6 and 8 of the work positioning gauge 210. The gauge 210 has its upper suface 230 engaging an undersurface of the carrier arm 30 so that the gauge 210 may be shifted laterally to position workpieces at different levels with respect to the carrier arm. Thus, in FIG. 5 and at right in FIG. 3, a workpiece 150 is shown positioned against the surface 231 of a gauge 210 which is in a different lateral position than the gauge 210 shown at the left in FIG. 3.

The workpieces may be loaded with the carrier arms in an upper position such as shown at the right in FIG. 3. At the plating tanks such as indicated at 121 in FIG. 3, elevator cam tracks 112 serve to raise the work units over the ends such as 121a of the plating tanks and then to immerse the work to the desired precisely controlled depth in the plating solution. Cathode rail sections such as indicated at 141 precisely determine the level of the carrier arms 30 as the carrier arms move longitudinally along the length of the plating tanks. The pivot shafts such as indicated at 80 at the left in FIG. 3 for the arms 30 are also precisely horizontally positioned by means of rails 50, 75 and 77. The carrier chain 44 is provided with rollers such as indicated at 47 riding on the straight rail sections 50 and 51 shown in cross section in FIG. 3. The carrier arms do not rest on the cam track section 112a while in the plating tanks, but are supported by the rigidly fixed outboard cathode rail sections such as indicated at 141 so as to contribute to accurate locating of the workpieces in the plating solution.

If it is desired to adjust the carrier arms for a different workpiece length and plating depth, for example, the gauge plates such as 210 are grasped at the portion 210c thereof, FIG. 9, and moved laterally relative ot the carrier arms 30 until a ball detent 218, FIG. 7, is engaged in the appropriate notch 211–214, FIG. 8. The corresponding positioning edge faces of the series 231–234 and 241–244 will then register with the work holding housings such as indicated at 221 and 222 in FIG. 3 to provide the desired depth of plating for the new length of workpieces.

In place of a positive connection between pivot members 91 and the carrier arm 30, any suitable quickly detachable coupling between these parts may be utilized, for example a friction fit or a sliding fit or either fit together with a suitable latch or detent such as indicated for parts 126 and 222 (including detent 260) in FIG. 6. This will facilitate automatic pre-loading of the carrier arms with work units prior to connection of the carrier arms with the conveyor parts 91, 70 and 44. In this case the work unit might be delivered directly from a machine tool which performs a machine operation on the work unit into a work magazine corresponding to carrier arm 30 but detachably engageable with the conveyor part 91 as above described.

The circles 95' and 96' at the right in FIG. 3 represent suitable detent means such as indicated at 260, 263 in FIG. 7 engaging in notches similar to that shown at 262 in carrier arm 30' to detachably retain the carrier arm with conveyor part 91'. The parts 30' and 91' may have a sliding fit such as illustrated in FIG. 4 (but with screws 95 and 96 omitted). The end wall of the slot in part 91 is indicated at 280 and the corresponding end wall of the slot bifurcating part 91' is indicated at 280'. The carrier arm or magazine part 30' is detachably held by detents 95', 96' with its end abutting flatwise with the end wall 280' of conveyor part 91'.

FIG. 3 at the right also illustrates a coupling consisting of a friction fit between parts 30' and 91' where 95', 96' are omitted or considered as unused apertures in part 91'.

Should it be desired to utilize the electroplating apparatus of FIG. 1 for plating transistor heads or the like, it is desirable to use the fixture assembly shown in FIG. 11. The fixture of FIG. 11 may be removed from the carrier arm 307 and loaded at a loading station remote the electroplating apparatus of FIG. 1. During the loading operation of transistors onto the mounting channels 280, the entire fixture 304 is inverted so that all of the brush assemblies 295 located within the mounting channels 280 will fall substantially to the bottom of the channel as shown in FIG. 10. The transistor heads 293 are then inserted into the indexing slot 291, and thereafter may be held in the indexing slot 291 by suitable retainer means located at the opposite ends of the slot. After the transistors have been loaded onto the fixture, the fixture is mounted onto the carrier arm assembly 307 so that the transistors are in a downward position as shown in FIG. 11. This will cause the brush assembly 295 in each of the mounting channels 280 to fall toward the transistors thereby causing the wire bristles 298 to engage the transistor leads 300–302, one of which is connected to the transistor head 293 to provide a current path required for the plating process. It can be seen that with the fixture shown in FIG. 11, the head portions of a multitude of transistors can be electroplated to an exact depth.

When a fixture such as that shown in FIG. 14 is utilized with the electroplating apparatus of FIG. 1, the fixture 339 can be removed from the carrier arm assembly 307 by loosening the set screw 343 and sliding the hub 341 and rack 347 off the bushing 342, whereby the fixture can be removed to a loading area remote from the plating apparatus of FIG. 1. The workpiece shown in FIG. 14 are of tubular form and are connected to the fixture by means of male plugs 350–355, each having a resilient body portion such as 350a. Each plug 350–355 is provided with shoulder 350b, which is preferably a taper, to serve as a stop for the upper edge 340a of the workpieces 340. After the workpieces 340 have been mounted on the fixture 339, the fixture can be connected to the carrier arm assembly 307 and the hub 341 secured in place on the bushing 342 by the set screw 343. The indexing pin 344 is received by the slot 341a to insure that the fixture 339 is maintained in a substantially vertical position over the plating solution 315.

Should it be desired to plate workpieces having a shape similar to that shown in FIGS. 15 and 16, the fixture shown therein proves advantageous. As shown in FIG. 15, the workpieces 360 are held in place by a spring clip 377 which is resiliently biased against a retainer 370. The workpieces 360 are inserted between the spring clip 377 and retainer 370 and are held in place thereby during the electroplating process. It will be understood that the fixtures shown in FIGS. 14 and 15 are extremely easy to load and unload, and therefore, the workpieces can be connected to the fixtures either at a station remote from the electroplating apparatus of FIG. 1 or at the electroplating apparatus.

It is important that the fixtures shown in FIGS. 11, 14 and 15 are maintained in a substantially horizontal position over the plating fluid 315 during the electroplating process. The horizontal position of these fixtures is controlled by the relationship of the cam 335 on the rod 325, shown in FIG. 12. The pivot pin 323 serves as a fixed point about which the carrier arm assembly 307 can rotate above and below the horizontal plane. As shown in FIG. 13, by merely loosening the set screw 337 and rotating the current cam 335 on the road 325 the carrier arm assembly 307 can be adjusted to a substantially horizontal position.

Of course a given processing machine may employ only one type of carrier arm assembly and only one type of fixture throughout. The channels 284 and 285 and the U-shaped member 281 are of electrical insulation material. Also, the bristles 298 may have a finite space between each wire forming the bristles and these wires may be laterally flexible to allow the leads 300–302 of the transistors to mesh or intermingle with the bristles 298 to provide for electric contact between an extended length portion of each lead and a plurality of laterally contacting bristles 298.

By way of example only and not of limitation, the following modifications and variations and additional details are given.

In FIG. 10, the wires 298 of electrically conductive material may have a lesser diameter and length than the leads 300–302. The wires 298 may have a space therebetween less than the diameter of the leads 300–302 and such that the wires 298 will be deflected slightly as the brush assembly 295 moves into engagement with the leads. The weight of the brush and its momentum (when the fixture 304 is returned from the orientation shown in FIG. 10 to that shown in FIG. 11) may be such as to insure that the leads 300–302 will penetrate a substantial distance into the brush, the leads 300–32 maintaining a substantially vertical orientation by virtue of the stiffness thereof. The wires 298 may have a stiffness which is not greater than and preferably less than the stiffness of the leads 300–302.

In FIG. 11, where stiffer and shorter leads are present as compared to leads 300–302, the wires 298 may be longer than the leads, but otherwise may have the characteristics relative to the shorter leads corresponding to those given in the preceding paragraph with respect to leads 300–302.

The bracket shown at 306 in FIG. 11 may be considered to be a diagrammatic representation of the parts 341, 342, 343, 344, 345 and 346 of FIG. 14, and the foregoing parts of FIG. 14 are hereby specifically disclosed as being substituted for the bracket 306 in FIG. 11. Thus in assembling fixture 304 on the carrier arm after loading thereof as indicated in FIG. 10, the hub 341 is slid onto the adapter sleeve 342 which has been previously fixed to rod 325, FIG. 11, by means of set screw 346 with its locating pin 344 (which is secured to sleeve 342) in a precisely vertical orientation. The plate 305 is, of course, suitably secured to the hub member 341 by screws or the like. In the illustrated embodiment the set screw 343 is seated in an annular groove 342a centrally of sleeve 342 so as to locate the fixture 304 in a desired location axially of rod 325, although the use of a spring urged detent associated with screw 343 such as spring urged ball 250, FIG. 5, associated with screw or press fit casing 254 is hereby specifically disclosed with respect to the bracket means 306 of FIG. 11. In such an embodiment, the ball would snap into groove 342a as hub 341 is slid onto sleeve 342 to securely locate the fixture 304 relative to arm 325, FIGS. 11, 12 and 13.

In each of the embodiments herein the screw 343 or 363 may house a spring urged ball as indicated at 250 in FIG. 5, so that the fixtures can be slid onto sleeve 342 or 362 and will be automatically located thereon by means of such spring urged ball engaging in groove 342a or 362a.

By way of specific exemplary detail the sloping side walls of groove 342a or 362a may define an included angle therebetween of 120°. The set screw 343 or 363 may have a central bore from the lower end of which projects a pin slidable in the bore. The pin may have a compression spring in the bore urging the pin outwardly. The maximum projection of the pin from the bore may be limited by a stop within the bore acting on a shoulder on the pin so that the pin will be cammed inwardly by the bevel end face 342b or 362b of sleeve 342 or 362. The wall 342b or 362b may define an angle of 30° relative to an axial direction, the same angle as the walls of groove 342a or groove 362a. Thus if the pin could only extend into the axial opening through sleeve 341 or 361 a distance of 40 mils, the depth of groove 342a or 362a being about 36 mils, then the bevel face 342b or 362b might extend 90 mils in the radial direction (1 mil=.001 inch). If the maximum width of groove 342a were .125 inch, the detent pin might have a diameter at its lower end of 1/16 inch with a rounded lower end exactly as indicated at 343a in FIG. 14 and 363a in FIG. 15. Thus, the showings of FIGS. 14 and 15 equally well represent a set screw 343 or 363 with an integral rounded tip end 343a or 363a, and a screw casing 343 or 363 having a hollow interior receiving the upper end of a spring urged detent pin 343a or 363a. The bevel face 342b or 362b may have an axial dimension of 5/32 inch for the other dimensions just given, for example.

In FIGS. 15 and 16, the U-shaped springs 377 may each have an aperture in the bight portion 377a thereof which receives the screw thread portion 370a. The nut 378 then serves to clamp the bight portion 377a against member 367. The free end 377b of each spring 377 may be curved away from the associated member such as 371 so that the free end edge thereof will be spaced from the associated member a distance greater than the thickness of a workpiece prior to engagement of the workpiece therewith. By this construction the workpiece may be slid against the active leg of the U-shaped spring to wedge the leg away from the adjacent surface of the member. Thus the workpiece can be assembled on the fixture quickly without any necessity for manually grasping the legs of the U-shaped springs to retract the same from engagement with the associated members prior to moving the workpieces under the active legs of the springs.

It will be apparent that certain of the broad concepts of this invention are applicable to a straight line processing machine where the load and unload ends of the machine are at opposite ends of a straight line work carrier path. Further certain broad features relating to the work mounting fixtures of this invention are applicable to work carrier arms which are not pivotally mounted at one end. In general it is the intent that the appended claims be construed to cover all those modifications and variations which will become obvious to those skilled in the art after study of the present specification, as well as to cover improvements hereon such as are built upon one or more of the novel concepts hereof and fall within the scope of one or more of the appended claims.

The following is a table illustrating by way of example, application of terms in the claims to exemplary parts in the drawings.

| Term in claims | Exemplary Part No. | Exemplary Figure No. |
|---|---|---|
| Conveyor part | 321 | 12 |
| Work carrier | 325 | 10 |
| Work mounting means | 280 | 10 |
| Socket | In part 221 | 5 |
| Detent means | 250 | 5 |
| Horizontal guides | 284, 285 | 10 |
| Grooves | 288, 289 | 10 |
| Resilient plugs | 350–355 | 14 |
| Spring clips | 377 | 15 |
| Guideway | Defined by parts 284, 285 | 10 |

The term "friction fit" is used herein to denote a location fit where sufficient lateral pressure is present between the mating parts to retain the parts in assembly during operation of the machine while accommodating repeated disassembly of the parts.

The term "sliding fit between . . . parts . . . without any positive connection therebetween" is used to cover a fit that is looser than a location fit together with an impositive retaining means such as the detent means 250 of FIG. 5 or detent means at 363a in FIG. 15.

Figures 17, 18, 19:
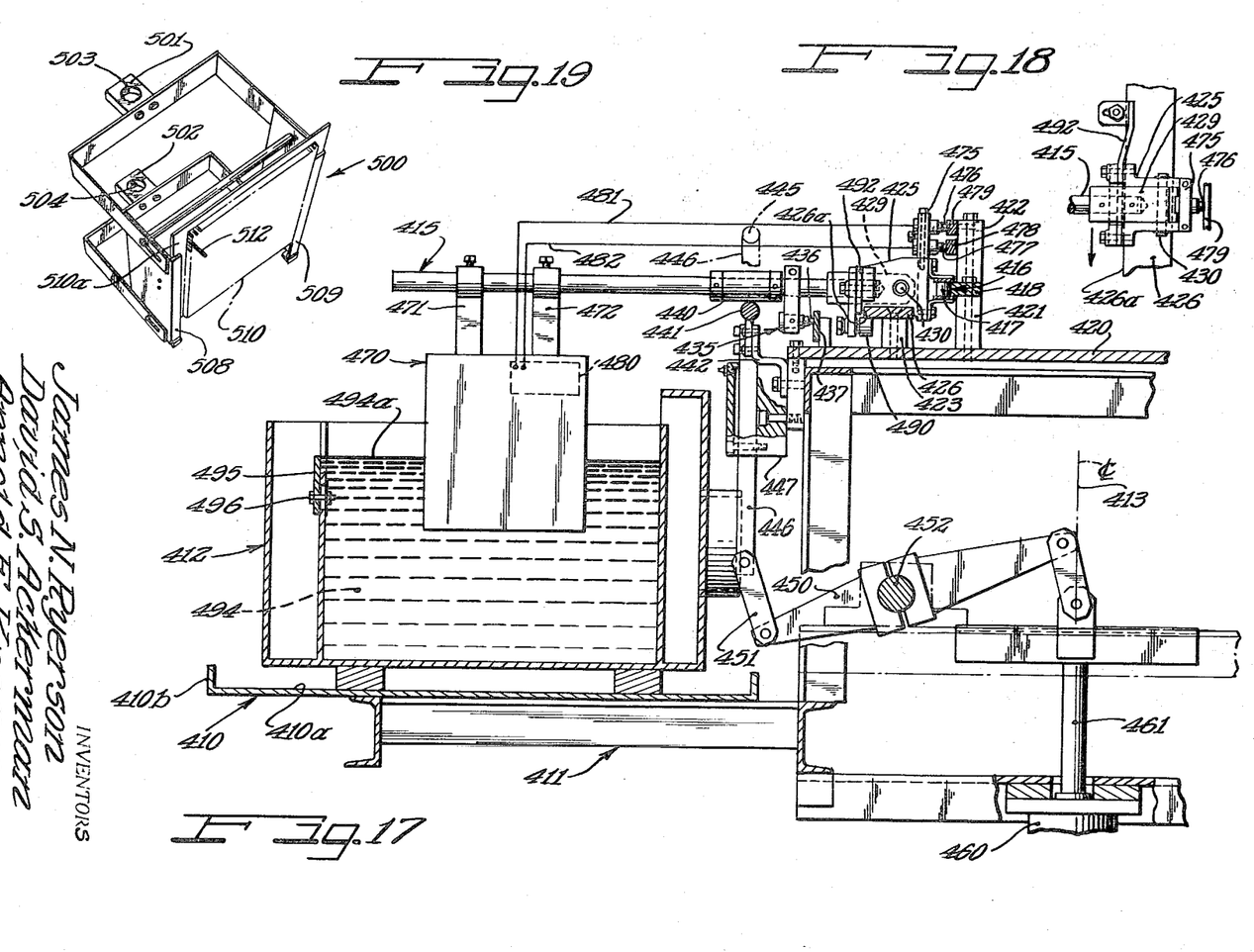
FIG. 17 is a somewhat diagrammatic vertical sectional view of a modified automatic processing machine, showing a barrel plating work container associated therewith.
FIG. 18 is a fragmentary somewhat diagrammatic plan view showing certain details of the machine of FIG. 17.
FIG. 19 is a somewhat diagrammatic perspective view of a work mounting fixture of a type which may be detachably secured to the carrier arms of the embodiment of FIGS. 17 and 18.

In FIG. 17, there is illustrated an automatic processing apparatus which may generally correspond to the preceding embodiments except for the changes which are apparent from the showing in FIG. 17. Thus the machine of FIG. 17 comprises a series of liquid containing tanks for automatic precious metal processing mounted on a table or platform 410 which is supported from the factory floor or other rigid horizontal surface by means of a frame 411. Mounting surface 410a of the table 410 may be located a substantial distance of the order of three feet above the floor, for example 34 inches. The loop series of processing tanks may include a gold plating tank 412, for example, having a height dimension of approximately 10 inches. The height of the tanks is thus a minor fraction (less than one-half) the height of the table mounting surface, as in the preceding embodiments. The machine is generally symmetrical with respect to a longitudinal center line whose location is indicated by dot dash line 413, as in the preceding embodiments. The outer edge 410b of the table may be located 36 inches from the line 413, for example.

The work units are circulated by means of work carriers such as indicated at 415 coupled with an endless chain conveyor 416. The conveyor includes rollers such as 417 riding on horizontal guide rails such as indicated at 418. A conveyor mounting plate 420 is shown supported from the framework 411 and provided with spacers such as 421 and 422 for mounting the rail 418.

At each carrier position along the chain 416, the chain is provided with angle brackets secured to a carrier arm attachment bracket such as indicated at 425. The attachment brackets 425 are guided by means of rails such as indicated at 426 which are also mounted on the plate 420, for example by means of spacers such as indicated at 428.

The carrier arm 415 is secured to the attachment bracket 425 by means of a pivot member 429 which is pivotal on a pivot shaft 430.

The carrier arm 415 is provided with an electrical contact assembly 435 including a spring loaded shoe 436 riding on cathode rail 437.

Each of the carrier arms 415 is provided with a roller 440 which is freely rotatable thereon and which rides on a horizontally extending rail section 441 at the plating tank 412. The rail section 441 is substantially coextensive with the cathode rail 437. This section 441 of the supporting rail for the carrier arms is fixed to the frame 411 by means of brackets such as indicated at 442. The rail section 441 is disposed in a horizontal plane and at a level to maintain the carrier arm 415 substantially horizontal throughout the longitudinal extent of the cathode rail 437. The plating tank 412 may have an operative length dimension (corresponding to the length of the cathode rail 437) which is a substantial multiple of the spacing between successive carrier arms 415, as is illustrated in FIG. 2 for the preceding embodiments, so that the plating tank receives a substantial number of said carrier arms therealong.

At the longitudinal ends of the tank 412 vertically movable rail sections may be provided such as the one indicated in dash outline at 445 (in the upper position). In the lower position of the elevator rail sections such as 445, these sections are in substantial alignment with the fixed rail section 441. The elevator rail sections such as 445 may be carried on vertically extending rods such as 446 which are guided for vertical reciprocation by means of guide brackets such as indicated at 447. The rods may be raised and lowered by means of crank arms such as 450 coupled therewith by means of links such as 451, the crank arms being secured to a line shaft such as indicated at 452 which may extend for the length of the machine. Two such line shafts, for example, may be driven from a common cylinder such as indicated at 460 located at the center line of the machine. The retraction of the piston rod 461 into the cylinder 460 causes the line shaft 452 to rock in the clockwise direction as viewed in FIG. 17 raising the elevator rail section 445 from a position in alignment with the fixed rail section 441 to a position as indicated in dash outline in FIG. 17. The raising of the rail section 445 of course causes a corresponding upward pivoting of the carrier arms having rollers such as 440 engaged with the elevator rail section so that the work units carried by such carrier arms will clear the ends of the respective tanks when the conveyor chain 416 is advanced. By holding the horizontal conveyor chain 416 stationary during elevation of the rail sections such as 445, a straight vertical movement of the carrier arms is accomplished. Similarly, of course, the carrier arms may be lowered at a controlled rate and in a vertically downward direction after an advance of the conveyor, to lower the work units into the next succeeding tanks.

It will be apparent that the carrier arms 415 may correspond to any of the arrangements previously described and each such arrangement and each of the associated work holders is hereby specifically disclosed as applied to the embodiment of FIG. 17.

It is further contemplated, however, that barrel plating assemblies such as indicated at 470 may be secured to the carrier arms 415. For example, suitable support brackets 471 and 472 may rigidly but detachably secure the barrel assembly 470 with the carrier arm 415. By way of specific example and not by way of limitation, the barrel plater assembly 470 may have a three inch by six inch size barrel with 1/16 inch diameter perforations, the basic assembly being available from National Plastics and Plating Supply Company, Terryville, Conn. For energizing the direct current motor of such a plater assembly 470, the attachment brackets such as 425 may be provided with upstanding posts 475 carrying respective electrically insulated spring urged shoes 476 and 477 riding on respective (electrically insulated) electrical contact rails 478 and 479. Electrical wiring from the brushes 476 and 477 to the terminals of the motor (indicated diagrammatically at 480) is indicated at 481 and 482.

For stabilizing the carrier arms 415 particularly when they are utilized for barrel plating, the carrier arm attachment bracket 425 may carry a pair of rollers such as the one indicated at 490 which are respectively longitudinally in advance of and behind the pivot member 429, and which ride on the undersurface of guide rail 426. For further stabilization and guidance, the attachment bracket 425 is shown as having an arm 492 fixed thereto (see FIG. 18). This arm 492 may extend rearwardly from the bracket 425 along rail 426 and carry at its trailing end a roller (not shown) rotatable on a vertical axis and riding on the vertical edge face 426a of rail 426.

The level 494a of the precious metal plating solution 494 is maintained substantially constant, particularly during controlled depth plating operation, by means of a level control device such as the vertically adjustable weir member 495 which is fixed at the desired level by clamping means such as indicated at 496.

FIG. 19 illustrates a work mounting fixture 500 having attachment blocks 501 and 502 with circular apertures for receiving the carrier arms such as shown at 415 in FIG. 17. The blocks are provided with set screws as indicated at 503 and 504 for locking the fixture 500 on the associated carrier arm in precisely horizontal orientation. The brackets 471 and 472 in FIG. 17 may have comparable apertures and set screws. The fixture 500 includes horizontal inturned flanges 508 and 509 for slidably receiving the edges of a work holder 510. The fixture 500 may include suitable leaf springs or the like (not shown) above the flanges 508, 509 for slidably engaging the upper surfaces of the edges of the work holder 510 and for holding the same in place on the flanges 508 and 509. The contour of the springs is preferably curved such that the work holder 510 may be slid into place along the flanges 508, 509 and under the leaf springs, with the leading edge of the work holder 510 acting to lift the leaf springs out of engagement with the upper surfaces of the flanges 508 and 509 to permit the work holder 510 to slide under the leaf springs. As diagrammatically indicated, the work holder 510 may have an array of rows and columns of spring type work holders for example similar to the holders of FIGS. 15 and 16. A typical work unit of rectangular blade configuration is indicated at 512, and it will be understood that its upper edge is in engagement with the undersurface 510a of fixture 510 so that the work unit 512 is precisely and rigidly located for controlled depth immersion in a precious metal plating solution as in the preceding embodiments, for example as illustrated in FIG. 15. For example there may be 1700 workpieces 512 detachably held by work holder 510, and the machine may operate to automatically process sixty carrier arms per hour.

The operation and remaining structure of the embodiments of FIGS. 17–19 will be understood from the corresponding description of the preceding embodiments.

In each of the embodiments disclosed herein, there is provided a series of liquid receiving processing tanks including an elongated plating tank having a precious metal plating solution therein, and means for maintaining at selected level of said precious metal plating solution in said plating tank with substantial precision. For example, the level control system of the aforementioned copending application Ser. No. 654,436, filed July 19, 1967 may be utilized with each of the embodiments to maintain a selected level of said plating solution so that a substantial number of parts per hour such as 900 parts per hour (and a substantial number of carrier arms per hour such as 450) as previously mentioned may receive a precious metal plating to a controlled depth with substantial precision and within, for example, plus or minus 1/16 inch. The series of processing tanks are supported on the mounting surface of the table at a substantially common level. The carrier supporting rail extending horizontally along the plating tank supports the carrier arms (and the work unit mounting means of FIGS. 1–16 and 19) essentially clear of and spaced above the liquid level in the precious metal plating tank. The carrier arms have rigid work unit mounting means for rigidly positioning work units in precisely determined depending relation thereo. It will be understood that the term "rigid" in this sense means functionally rigid. Thus in FIG. 19, the work units such as 512 are rigidly positioned relative to the carrier arm, even though forces in the upward direction exceeding those encountered in practice could deflect the leaf springs which fix the work holder 510 relative to fixture 500, for example.

The carrier arms are provided with rail engaging means such as roller 440, FIG. 17, for determining rigidly the level of the carrier arms with substantial precision as the carrier arms move along their supporting rail such as rail section 441 at the precious metal plating tank 412. Thus the series of carrier arms at the precious metal plating tank are maintained at a substantial constant level to move only a precisely determined lower portion of each work unit through the precious metal plating solution. The result is the automatic table top precious metal processing of substantial numbers of carrier arms per hour without substantial wastage of the precious metal and without the need for manual intervention during the successive processing steps which are carried out by the series of tanks.

The disclosures of the aforementioned copending Ryerson et al. applications are specifically incorporated herein to correct any typographical errors and to disclose further concepts and teachings. Further, each of the embodiments described or shown herein is specifically disclosed as incorporating all of the alternative features and modifications of the other embodiments which are applicable thereto including dimensional and other limitations. While certain specific embodiments have been described in detail by way of example, it will be understood that changes may be made to adapt the machine to the processing of different types of parts and to execute different desired treatment cycles. It will be appreciated therefore that the invention is susceptible to modification, variation and change without departing from the proper scope or fair meaning of the claims appended hereto.

We claim as our invention:

1. A metal plating processing machine comprising
   a table having an upper horizontal surface and having a supporting frame for supporting said table at a substantial height above a machine floor level,
   a series of plating processing tanks mounted on said horizontal surfaces of said table and having piping connected therewith and extending beneath said table and within said supporting frame,
   a canopy resting on said table and substantially enclosing said series of processing tanks and having air discharge vents on the top thereof,
   blower means beneath said table and within said frame for circulation of air through said piping into the space beneath said canopy and above said table and discharge to atmosphere through said air discharge vents, conveyor means supported on said table and within said canopy for moving work units horizontally through said series of processing tanks, and means attached to said conveyor means for suspending and immersing work pieces in said tanks.

2. A processing machine comprising means defining a series of processing stations, a conveyor disposed for movement along a path past the series of processing stations, conveyor parts pivotally coupled to said conveyor at intervals therealong for movement along said path and for pivotal movement in a plane transverse to said path, and work carriers comprising horizontal extended arms for movement by said conveyor through said series of stations and for pivotal movement with said conveyor parts, said conveyor parts and work carriers having means providing a quickly detachable connection between said conveyor parts and said arms to facilitate loading of said work carriers with work units prior to connection of said work carriers with said conveyor parts.

3. A precious metal plating machine comprising a series of processing tanks including a precious metal plating tank having a given height dimension and rinse tanks, a framework, and a table supported by said framework and having an upper horizontal surface for supporting said series of tanks including said precious metal plating tank and said rinse tanks at a distance above a floor level substantially greater than said given height dimension and of the order of three feet, said rinse tanks having water supply and drains prepiped integrally with said framework, conveyor means secured to said framework, and pivoted members mounted at spaced intervals on said conveyor for attachment of carriers for moving work units through said series of processing tanks, ventilation for said tanks and direct current power supply units for said conveyor mounted integrally with said framework, said machine comprising said series of tanks, said water supply and drains, said ventilation and direct power supply units, and said conveyor means forming a substantially complete and integrated package requiring a minimum of site preparation for installation and use.

4. A work carrier comprising (a) a carrier arm for horizontal movement along a carrier arm path and having a lower downwardly directed horizontal edge face, (b) a work positioning plate having an upper horizontal edge face in sliding engagement with said carrier arm edge face and having a series of lower downwardly directed edge faces at successive different vertical distances from the horizontal edge face of said plate, (c) means secured to said arm and engageable with said plate to fix the plate at a plurality of different work locating positions and to accommodate horizontal shifting of said plate along the horizontal edge face of said carrier arm between the successive positions, and (d) work holding means secured to said carrier arm for holding work pieces with an upper edge of the work pieces abutting any of said series of downwardly directed edge faces of said plate depending upon the position of said plate, the spacing between the work locating positions of the plate corresponding to the spacing between the successive edge faces of said series.

5. A precious metal plating machine comprising a series of liquid receiving processing tanks including an elongated precious metal plating tank having a precious metal plating solution maintained at a substantially constant level, a conveyor extending along said series of processing tanks and having carrier arms coupled therewith so as to be moved in a longitudinal direction along said series of tanks and along the length of said precious metal plating tank, said precious metal plating tank receiving a series of said carrier arms in longitudinally spaced relation along the length thereof, elevator means providing for upward movement of each successive carrier arm to clear work units carried thereby of the ends of the tanks and providing for downward movement of each successive carrier arm after transfer across the ends of the tanks, for automatic treatment of work units carried by the carrier arms in the successive tanks, an elongated rail extending along the length of said precious metal plating tank at a substantially constant level, said carrier arms having work unit mounting means securely positioned relative thereto for mounting work units in precisely determined relation thereto, and said carrier arms having rail engaging means in engagement with said elongated rail as the carrier arms move along the length of said precious metal plating tank, means comprising the engagement of said rail engaging means with said elongated rail for maintaining the work unit mounting means of the carrier arms at a substantially constant level as they are moved along said precious metal plating tank, the work unit mounting means of said series of carrier arms along said precious metal plating tank being maintained by said elongated rail in spaced relation above the level of said precious metal plating solution, and said work unit mounting means of said series of carrier arms at said precious metal plating tank being disposed to immerse a lower portion only of the work units mounted thereby in said precious metal plating solution and maintaining the work units at a substantially constant level to move only said lower portion of each work unit through the precious metal plating solution, and a framework having a table with a mounting surface supported by said framework at a substantial distance of the order of three feet above a floor level, said table carrying said series of processing tanks including said elongated precious metal plating tank on the mounting surface thereof to provide for automatic table top precious metal processing of the work units without substantial wastage of the precious metal of said precious metal plating solution.

6. A precious metal plating machine according to claim 5 with said series of processing tanks including rinse tanks, said mounting surface of said table supporting said series of tanks including said precious metal plating tank and said rinse tanks at a distance above a floor level substantially of the order of three feet.

7. A precious metal plating machine according to claim 6 with said rinse tanks having water supply and drains prepiped integrally with said framework, ventilation and direct current power supply units mounted integrally with said framework, and conveyor means secured to said framework for moving work units through said series of processing tanks, said machine comprising said series of tanks, said water supply and drains, said ventilation and direct power supply units, and said conveyor means forming a substantially complete and integrated package requiring a minimum of site preparation for installation and use.

8. A work carrier comprising a horizontally disposed carrier arm, means for moving said arm along a generally horizontal path, a positioning plate having an upper edge in sliding engagement with said carrier arm, means secured to said arm for fixing said plate at a plurality of different work locating positions and to accommodate horizontal shifting of said plate along said arm, a series of lower downwardly directed edge faces on said plate, said faces being at different vertical positions, and work holding means secured to said carrier arm for holding work pieces in abutment with selected downwardly directed edge faces of said plate.

9. A metal plating machine comprising a series of liquid receiving processing tanks including an elongated metal plating tank adapted to maintain a plating solution at a substantially constant level, a conveyor extending along said series of processing tanks and having carrier arms coupled therewith so as to be moved in a longitudinal direction along and above said series of tanks, said arms being spaced so as to present a plurality of arms adapted to carry work units along the lengths of said plating tanks, elevator means providing for upward movement of each successive carrier arm to a sufficient extent to permit said work units to clear the ends of said tanks, and providing for downward movement of each successive carrier arm after transfer across the ends of the tanks, an elongated rail extending along the length of said metal plating tanks at a substantially constant level, said carrier arms having work unit mounting means securely positioned relative thereto for mounting work units in precisely determined relation thereto, and said carrier arms having rail engaging means in engagement with said elongated rail as the carrier arms move along the length of said metal plating tank, means, including said rail and rail engaging means, for maintaining said work unit mounting means at a substantially constant level during transit along said metal plating tanks, so as to immerse a lower position only of said mounted work units in the metal plating solution while avoiding immersion of the carrier arm, and a framework having a table with a mounting surface supported by said framework at a substantial distance above floor level, said table carrying said series of processing tanks on the mounting surface thereof to provide for automatic table-top metal processing of the work units without substantial wastage of metal plating solution.

10. A metal plating machine in accordance with claim 9 in which said carrier arms are detachably secured to members pivoted by a pivot element to said conveyor so as to enable each said member and attached arm to swing vertically about said pivot element.

11. A metal plating machine in accordance with claim 10 in which said rail is located beneath said carrier arms and said rail engaging means are rollers mounted on said arms.

12. A metal plating machine in accordance with claim 11 in which said elevator means includes a section of rail aligned with but detached from the rail extending along the length of said metal plating tanks, and power operated, vertically reciprocable rods supporting such detached section of rail and serving to elevate and lower the same.

13. A metal plating machine in accordance with claim 9 including barrel plater assemblies equipped with rotational drive, mounted on said carrier arms, and means to energize said drive during traverse of said tanks by said assemblies.

14. A metal plating machine in accordance with claim 13 in which said barrel plater assemblies are securely fastened to said carrier arms by said work unit mounting means and are adapted to be lifted clear of said tank ends by said elevator means.

15. A metal plating machine in accordance with claim 9 including work mounting fixtures having blocks with apertures for mounting said fixtures on said carrier arms.

References Cited
UNITED STATES PATENTS

| | | | |
|---|---|---|---|
| 1,570,819 | 1/1926 | Bart | 204—202X |
| 1,868,320 | 7/1932 | Hannon | 204—202 |
| 2,187,079 | 1/1940 | Hannon | 204—202X |
| 2,222,839 | 11/1940 | Hall et al. | 204—202 |
| 2,479,322 | 8/1949 | Davis | 204—202X |
| 2,482,269 | 9/1949 | Grimes | 204—202X |
| 3,073,324 | 1/1963 | Finston | 204—198X |
| 3,200,052 | 8/1965 | Huffman et al. | 204—213X |
| 3,429,797 | 2/1969 | Jackson et al. | 204—202 |

JOHN H. MACK, Primary Examiner

R. J. FAY, Assistant Examiner

U.S. Cl. X.R.

118—423; 204—198